(12) United States Patent
Liu et al.

(10) Patent No.: US 12,100,096 B2
(45) Date of Patent: Sep. 24, 2024

(54) METHOD, ELECTRONIC DEVICE, AND COMPUTER PROGRAM PRODUCT FOR RENDERING TARGET SCENE

(71) Applicant: Dell Products L.P., Round Rock, TX (US)

(72) Inventors: Zhisong Liu, Shenzhen (CN); Zijia Wang, WeiFang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 165 days.

(21) Appl. No.: 17/883,828

(22) Filed: Aug. 9, 2022

(65) Prior Publication Data
US 2024/0029341 A1    Jan. 25, 2024

(30) Foreign Application Priority Data

Jul. 22, 2022  (CN) .......................... 202210869673.5

(51) Int. Cl.
*G06T 15/20*  (2011.01)
*G06T 7/73*   (2017.01)
*G06T 7/80*   (2017.01)

(52) U.S. Cl.
CPC .............. *G06T 15/205* (2013.01); *G06T 7/73* (2017.01); *G06T 7/80* (2017.01); *G06T 2207/10028* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 2017/0280133 A1* | 9/2017 | Niemelä | H04N 13/156 |
| 2022/0254068 A1* | 8/2022 | Fleureau | G06T 15/20 |
| 2023/0401837 A1* | 12/2023 | Yan | G06V 20/56 |

FOREIGN PATENT DOCUMENTS

WO   WO-2020146664 A1 *  7/2020  ............ G01S 17/89

OTHER PUBLICATIONS

Wang et al., CN 113076615 A (Year: 2021).*
Lai et al., CN 112581541 A (Year: 2021).*
Xu et al., CN 109285145 A (Year: 2019).*
Canny Edge detector, Jun. 21, 2022, "https://web.archive.org/web/20220621021050/https://en.wikipedia.org/wiki/Canny_edge_detector" (Year: 2022).*
Tree measurement on smart phone (Year: 2019).*
Edge Maps (Year: 2021).*

(Continued)

*Primary Examiner* — Steven Z Elbinger
(74) *Attorney, Agent, or Firm* — Ryan, Mason & Lewis, LLP

(57) ABSTRACT

Embodiments of the present disclosure relate to a method, an electronic device, and a computer program product for rendering a target scene. The method includes acquiring from a server rendering data including a point cloud and a color of the target scene. The method further includes determining a pose used for rendering the target scene at user equipment. The method further includes rendering the target scene on the basis of the rendering data and the pose, so as to show the target scene in the pose. In embodiments of the present disclosure, a rendering effect on the target scene can be improved, and the rendering speed is higher.

18 Claims, 6 Drawing Sheets

(56) References Cited

OTHER PUBLICATIONS

Robot vision (Year: 2021).*
Wikipedia Canny Edge Detector (Year: 2021).*
K. Park et al., "Nerfies: Deformable Neural Radiance Fields," IEEE/CVF International Conference on Computer Vision, arXiv:2011.12948v5, Sep. 10, 2021, 18 pages.
G. Gafni et al., "Dynamic Neural Radiance Fields for Monocular 4D Facial Avatar Reconstruction," IEEE/CVF Conference on Computer Vision and Pattern Recognition, Jun. 2021, pp. 8649-8658.
S. Peng et al., "Animatable Neural Radiance Fields for Modeling Dynamic Human Bodies," IEEE/CVF Conference on Computer Vision and Pattern Recognition, Jun. 2021, pp. 14314-14323.
B. Mildenhall et al., "NeRF: Representing Scenes as Neural Radiance Fields for View Synthesis," European Conference on Computer Vision, Aug. 2020, 17 pages.
T. Müller et al., "Instant Neural Graphics Primitives with a Multiresolution Hash Encoding," arXiv:2201.05989v2, May 4, 2022, 15 pages.
J. T. Barron et al., "Mip-NeRF 360: Unbounded Anti-Aliased Neural Radiance Fields," Conference on Computer Vision and Pattern Recognition, arXiv:2111.12077v3, Mar. 25, 2022, 18 pages.
J. C. Carr et al., "Reconstruction and Representation of 3D Objects with Radial Basis Functions," Proceedings of the 28th Annual Conference on Computer Graphics and Interactive Techniques, Aug. 2001, 10 pages.
S. Izadi et al., "KinectFusion: Real-Time 3D Reconstruction and Interaction Using a Moving Depth Camera," Proceedings of the 24th ACM Symposium on User Interface Software and Technology, Oct. 2011, 10 pages.
S. Lombardi et al., "Mixture of Volumetric Primitives for Efficient Neural Rendering," ACM Transactions on Graphics, vol. 40, No. 4, Aug. 2021, pp. 59:1-59:13.
W. Xian et al., "Space-time Neural Irradiance Fields for Free-Viewpoint Video," IEEE/CVF Conference on Computer Vision and Pattern Recognition, Jun. 2021, pp. 9421-9431.
M. Corsini et al., "Efficient and Flexible Sampling with Blue Noise Properties of Triangular Meshes," IEEE Transactions on Visualization and Computer Graphics, vol. 18, No. 6, Jun. 2012, 12 pages.
H. Huang et al., "Edge-Aware Point Set Resampling," ACM Transactions on Graphics, vol. 32, No. 1, Jan. 2013, pp. 9:1-9:11.

* cited by examiner

METHOD, ELECTRONIC DEVICE, AND COMPUTER PROGRAM PRODUCT FOR RENDERING TARGET SCENE

RELATED APPLICATION(S)

The present application claims priority to Chinese Patent Application No. 202210869673.5, filed Jul. 22, 2022, and entitled "Method, Electronic Device, and Computer Program Product for Rendering Target Scene," which is incorporated by reference herein in its entirety.

FIELD

Embodiments of the present disclosure relate to the field of computers, and more particularly, to a method, an electronic device, and a computer program product for rendering a target scene.

BACKGROUND

With the development of computer graphics and the improvement of performance of computing devices, in some application fields (e.g., virtual reality), users have increasingly high requirements for rendering of three-dimensional scenes. Users expect the rendering to be fast enough (for example, real-time) and have a good showing effect. During rendering of large and complex scenes, it is difficult to achieve real-time rendering and meet the requirement for the rendering effect at the same time.

SUMMARY

Embodiments of the present disclosure provide a method, an electronic device, and a computer program product for rendering a target scene.

According to a first aspect of the present disclosure, a method for rendering a target scene is provided. The method includes acquiring from a server rendering data including a point cloud and a color of the target scene. The method further includes determining a pose used for rendering the target scene at user equipment. The method further includes rendering the target scene on the basis of the rendering data and the pose, so as to show the target scene in the pose.

According to a second aspect of the present disclosure, a method for rendering a target scene is provided. The method includes acquiring from a server an edge graph that represents an outline of the target scene. The method further includes determining a pose used for rendering the target scene at user equipment. The method further includes rendering the target scene on the basis of the edge graph and the pose, so as to show the target scene in the pose.

According to a third aspect of the present disclosure, an electronic device is also provided. The electronic device includes a processor and a memory coupled to the processor. The memory has instructions stored therein which, when executed by the processor, cause the device to perform actions. The actions include acquiring from a server rendering data including a point cloud and a color of a target scene. The actions further include determining a pose used for rendering the target scene at user equipment. The actions further include rendering the target scene on the basis of the rendering data and the pose, so as to show the target scene in the pose.

According to a fourth aspect of the present disclosure, an electronic device is also provided. The electronic device includes a processor and a memory coupled to the processor. The memory has instructions stored therein which, when executed by the processor, cause the device to perform actions. The actions include acquiring from a server an edge graph that represents an outline of a target scene. The actions further include determining a pose used for rendering the target scene at user equipment. The actions further include rendering the target scene on the basis of the edge graph and the pose, so as to show the target scene in the pose.

According to a fifth aspect of the present disclosure, a computer program product is provided. The computer program product is tangibly stored on a non-transitory computer-readable medium and includes computer-executable instructions, wherein the computer-executable instructions, when executed by a device, cause the device to perform the method according to the first aspect.

According to a sixth aspect of the present disclosure, a computer program product is provided. The computer program product is tangibly stored on a non-transitory computer-readable medium and includes computer-executable instructions, wherein the computer-executable instructions, when executed by a device, cause the device to perform the method according to the second aspect.

This Summary is provided to introduce the selection of concepts in a simplified form, which will be further described in the Detailed Description below. The Summary is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

DETAILED DESCRIPTION

Embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In addition, all specific numerical values herein are examples, which are provided only to aid understanding, and are not intended to limit the scope.

In virtual reality, modeling and rendering a three-dimensional scene directly requires many computing resources, which usually cannot be completed on a user equipment side. If a three-dimensional scene is modeled on a server side, it may not be practical to directly transmit all the rendering data to the user equipment, because the rendering data can be very large, and the transmission of such data requires substantial bandwidth and time. At the same time, the computing capability of the user equipment may be insufficient, such that a frame rate of rendering of a target scene is insufficient to meet the needs. Therefore, real-time rendering and a good rendering effect cannot be achieved.

In order to solve the above disadvantages, embodiments of the present disclosure provide a solution for rendering a target scene. The solution uses images of the target scene photographed in different poses to model the target scene, so as to acquire rendering data. The rendering data includes point cloud and color information about the target scene. When needed, the rendering data is transmitted to the user equipment. A target scene in an observation pose is rendered on the basis of the observation pose set by a user. In this way, the bandwidth and time required for transmitting the rendering data can be saved, and the computational overhead of rendering the target scene by the user equipment can be reduced.

Figure 1:
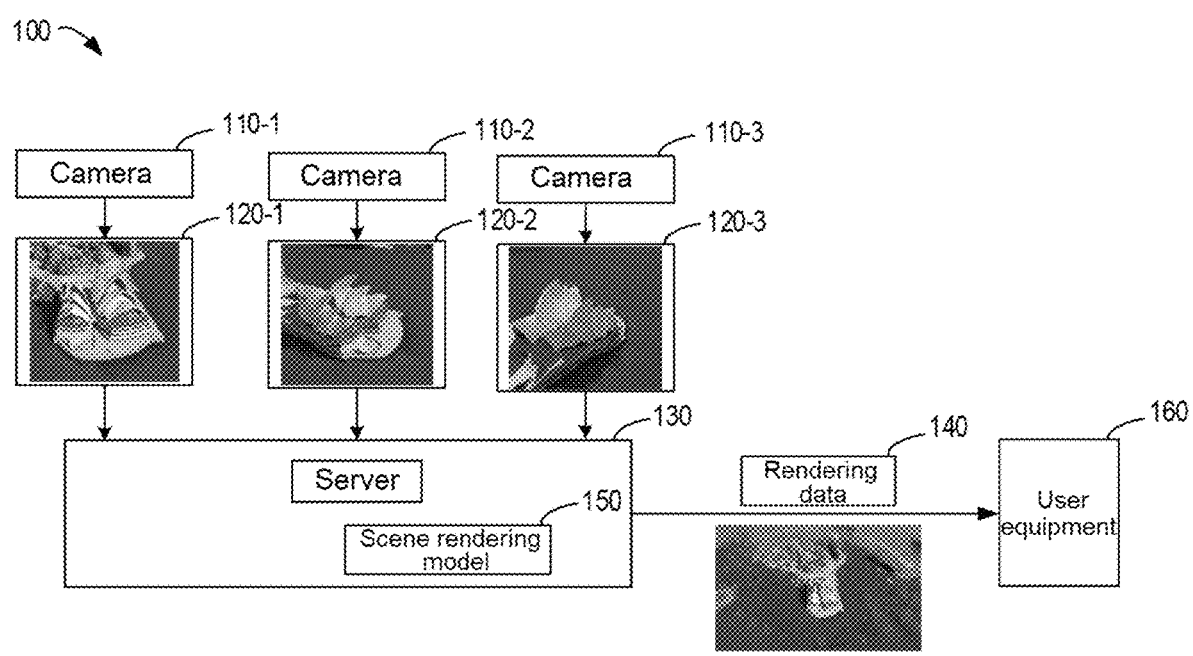
FIG. 1 is a schematic diagram of an example environment in which an embodiment of the present disclosure may be implemented.

FIG. 1 illustrates an example environment 100 in which an embodiment of the present disclosure may be implemented. As shown in FIG. 1, example environment 100 may include camera 110-1, camera 110-2, and camera 110-3 (referred to individually or collectively as camera 110). Cameras 110-1 to 110-3 are placed at different positions to photograph a target scene from different angles, and images 120-1 to 120-3 (referred to individually or collectively as image 120) of the target scene are obtained. Since different cameras 110 have different poses, it can be understood that a corresponding target scene photographed by camera 110 in different poses may have different outlines, and even different colors due to lighting. Alternatively, images of the target scene from different angles can also be obtained by taking multiple pictures with one camera.

Server 130 is further included in environment 100, which may be a single server, a distributed server, or a cloud-based server. Server 130 may receive image 120 from camera 110 and the pose of camera 110, or directly acquire, in other ways, a plurality of images 120 of the target scene and the pose of a camera that photographs these images. Server 130 may generate rendering data 140 by learning volume density features and color features of the target scene using a scene rendering model of the present disclosure on the basis of the plurality of images 120 and the pose of camera 110.

Scene rendering model 150 may also be configured in server 130. For example, scene rendering model 150 is deployed in server 130. Scene rendering model 150 may be used for generating rendering data 140 on the basis of image 120 and the pose of camera 110. The scene rendering model can be generated by training with a loss function associated with the target scene on the basis of the architecture of a machine learning model. The loss function may include errors associated with a target color feature, a target volume density feature, and an edge score, and the machine learning model is caused to learn optimized model parameters using an error back-propagation algorithm. The loss function can be classified into a loss function for fine-grained rendering data, a loss function for coarse-grained rendering data, and a loss function for edge graphs.

User equipment 160 is also included in environment 100. User equipment 160 may be a mobile device, a virtual reality device, a computer, or the like. At user equipment 160, rendering data 140 of a target scene from server 130 may be received. When a user needs to observe the target scene in a certain pose, the pose for observing the target scene is set by the user or is collected by user equipment 160. User equipment 160 renders a point cloud and a color of the target scene in this pose on the basis of rendering data 140 and this pose for presentation. User equipment 160 may also receive scene rendering model 150 for rendering the target scene.

It should be understood that the architecture and functions of example environment 100 are described for illustrative purposes only, without implying any limitation to the scope of the present disclosure. Embodiments of the present disclosure may also be applied to other environments having different structures and/or functions.

Example processes according to embodiments of the present disclosure will be described in detail below with reference to FIG. 2 to FIG. 7. For ease of understanding, the specific data mentioned in the following description are all illustrative and are not intended to limit the scope of protection of the present disclosure. It should be understood that embodiments to be described below may also include additional actions not shown and/or may omit actions shown, and the scope of the present disclosure is not limited in this regard.

Figure 2:
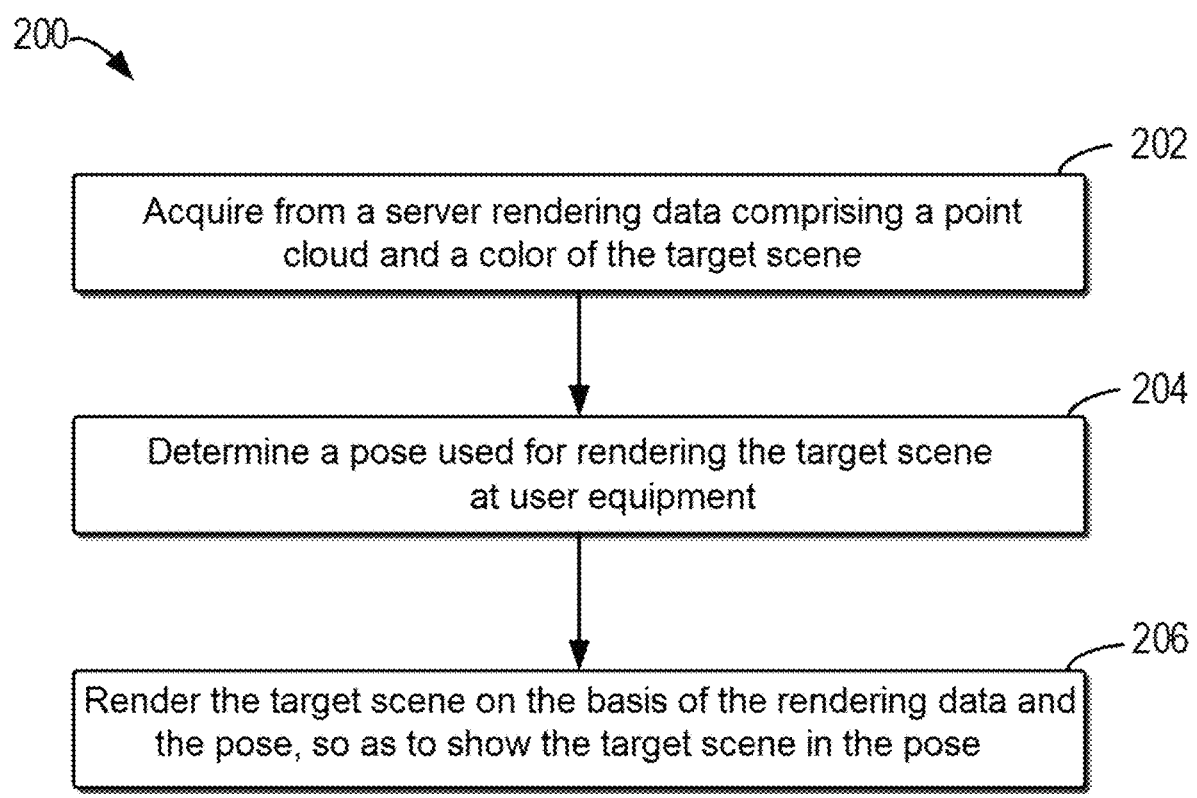
FIG. 2 is a flow chart of a method for rendering a target scene according to an example implementation of the present disclosure.

FIG. 2 illustrates a method 200 for rendering a target scene according to an example implementation of the present disclosure. At block 202, rendering data including a point cloud and a color of the target scene is acquired from a server. For example, user equipment 160 acquires rendering data 140 from server 130. Rendering data 140 includes point cloud and color information about the target scene. It can be understood that the size of rendering data 140 is related to the granularity of the point cloud and color information about the target scene. A fine granularity will result in rendering data 140 having an extremely large size, while a coarse granularity will result in rendering data 140 having a smaller size.

Fine-grained rendering data 140 has a good rendering effect, but takes up a great bandwidth and spends much time in transmission. Coarse-grained rendering data 140 has a small size and is thus convenient to transmit. Therefore, coarse-grained rendering data 140 is usually sent from server 130 to user equipment 160. The manner in which scene rendering model 150 is used to generate rendering data 140 will be described in more detail below with reference to the examples in FIGS. 3 to 6, and such description will not be repeated here.

At block 204, a pose used for rendering the target scene at user equipment is determined. In user equipment 160, if a user uses a computing device such as a mobile terminal, a pose for observing the target scene can be set via the user equipment. If the user wears a virtual display device such as a head-mounted display device, a pose for observing the target scene can be collected via the virtual display device. It can be understood that due to different poses for observing the target scene, rendered target scenes may have different sizes, outlines, or colors.

At block 206, the target scene is rendered on the basis of the rendering data and the pose, so as to show the target scene in the pose. For example, user equipment 160 renders the target scene using scene rendering model 150 on the basis of rendering data 140 and the set pose for observing the target scene, so as to show the target scene in the pose to the user.

Since the coarse-grained rendering data is transmitted by the server to the user equipment, the bandwidth and time required for the transmission of the data are saved. At the user equipment, since the scene rendering model is used to render the target scene on the basis of coarse-grained rendering data, the computing overhead of the user equipment can be saved, and rendering at a high frame rate is achieved, thus achieving real-time rendering.

Figure 3:
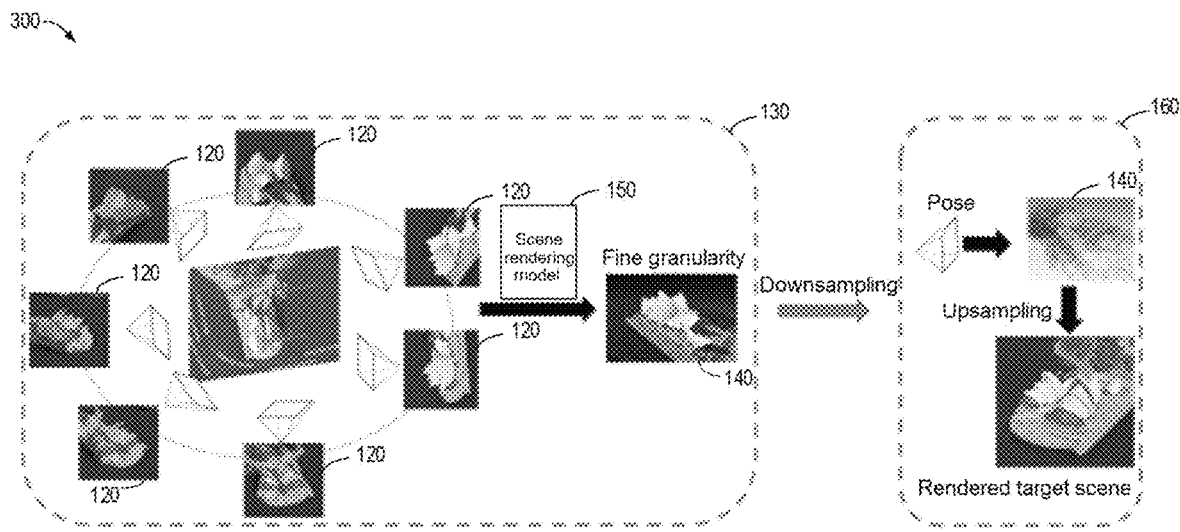
FIG. 3 is a schematic diagram of a process of rendering a target scene according to an example implementation of the present disclosure.

FIG. 3 illustrates a process 300 for rendering a target scene according to an example implementation of the present disclosure. Method 200 can be implemented in process 300 shown in FIG. 3.

In some embodiments, the rendering data is first rendering data, and the first rendering data is determined by performing downsampling on second rendering data, the resolution of the second rendering data being greater than that of the first rendering data. As an example, scene rendering model 150 may be used to generate fine-grained rendering data (referred to as second rendering data) on the basis of image 120 and the pose of camera 110, and fine-grained rendering data 140 may be downsampled to acquire coarse-grained rendering data 140 (referred to as first rendering data). Downsampling may be achieved by a uniform downsampling method or by edge-aware downsampling. As an example, redundant rendering data may be reduced by the Poisson disk method.

In some embodiments, rendering the target scene on the basis of the rendering data and the pose includes: performing upsampling on the first rendering data on the basis of the pose to determine the first rendering data after upsampling; and determining the point cloud and the color of the target scene in the pose using the first rendering data after upsampling. As an example, since user equipment 160 receives coarse-grained rendering data 140 which cannot yet reflect detailed features of the target scene, after the pose for observing the target scene is determined, the detailed features of the target scene in the pose need to be rendered. At this time, an upsampling method can be used, that is, on the basis of coarse-grained rendering data 140, rendering data 140 may be made dense by an upsampling method such as interpolation, so that the detailed features of the target scene can be reflected to achieve a good rendering effect.

It can be understood that upsampling such as interpolation has a low requirement for the computing capability of the user equipment, and the granularity of the upsampling may also be adjusted on the basis of the computing capability of the user equipment. Therefore, a flexible rendering effect can be achieved. That is, different rendering effects are adjusted according to different computing capabilities.

Figure 4:
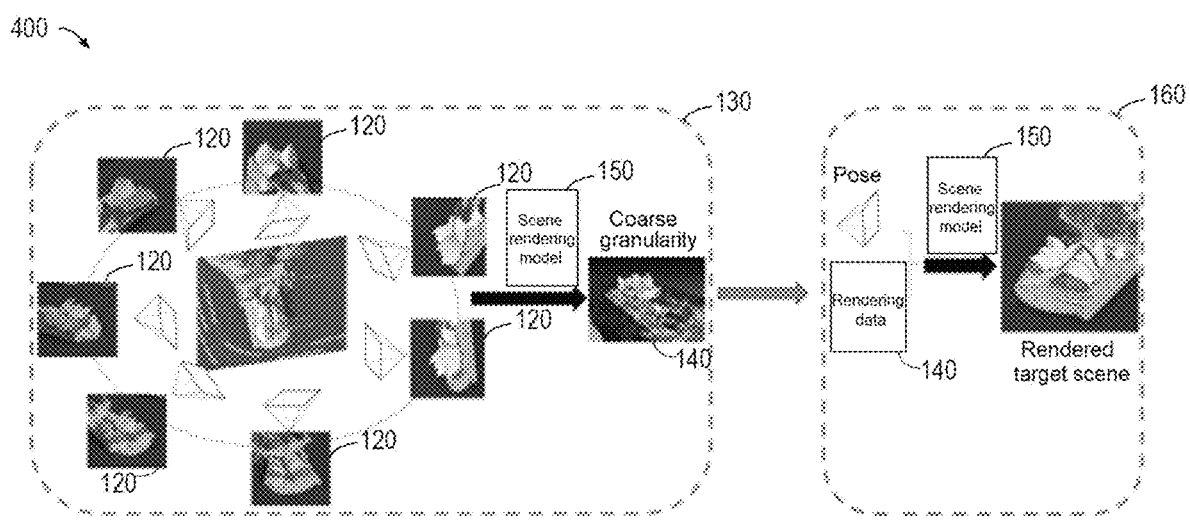
FIG. 4 is a schematic diagram of a process of rendering a target scene according to an example implementation of the present disclosure.
Figure 5:
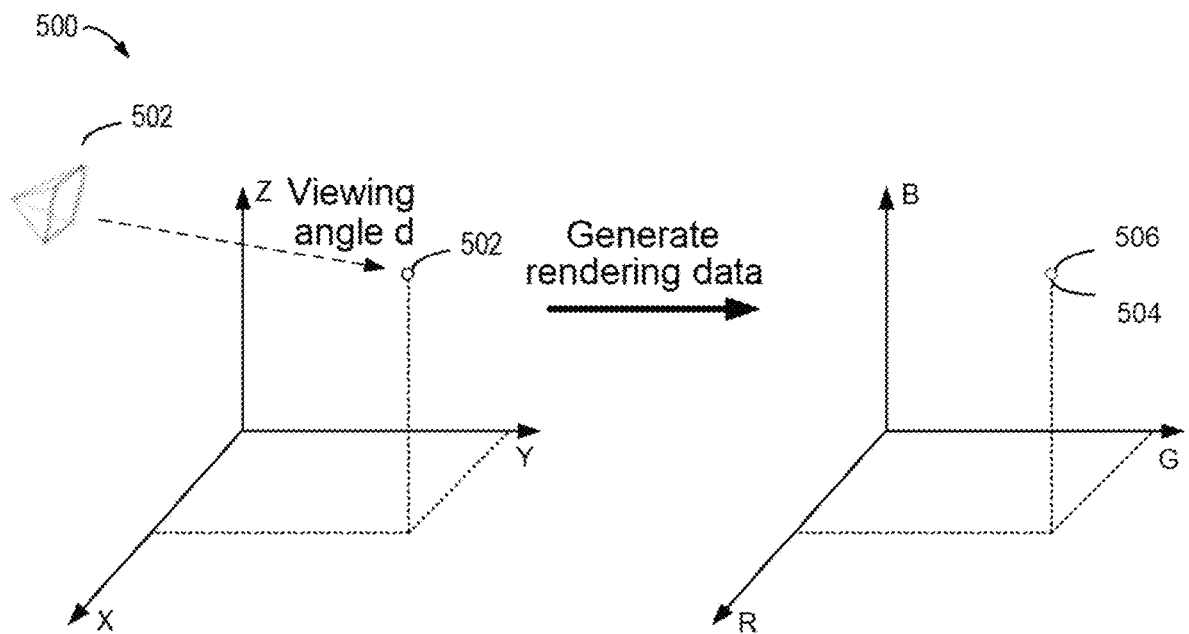
FIG. 5 is a schematic diagram of a process of generating rendering data according to an example implementation the present disclosure.
Figure 6:
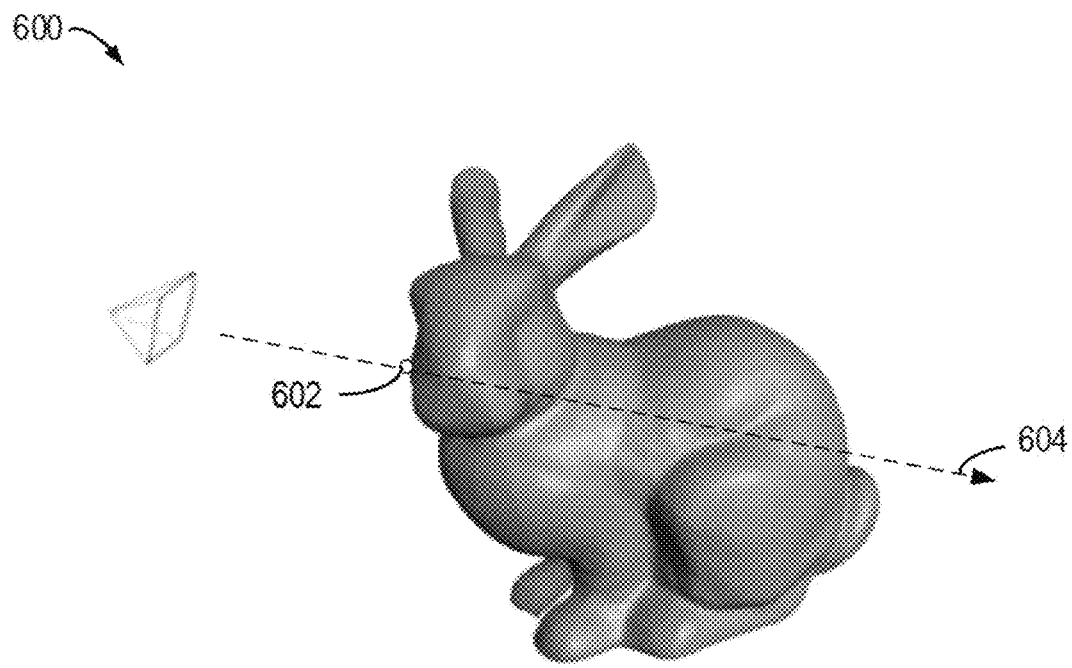
FIG. 6 is a schematic diagram of a rendering process of a scene rendering model according to an example implementation of the present disclosure.

In addition to the downsampling method, other methods can also be used to make fine-grained rendering data sparse. For example, FIG. 4 illustrates a process 400 for rendering a target scene according to an example implementation of the present disclosure. FIG. 5 illustrates a process 500 for generating rendering data by a scene rendering model according to an example implementation of the present disclosure. FIG. 6 illustrates a rendering process 600 of a scene rendering model according to an example implementation of the present disclosure. How to generate coarse-grained rendering data or fine-grained rendering data using scene rendering model 150 will be described below with reference to FIG. 4 to FIG. 6.

In some embodiments, a scene rendering model is acquired from a server, and a target scene is rendered using the scene rendering model. As an example, referring to FIG. 4, user equipment 160 may acquire scene rendering model 150 from server 130. Scene rendering model 150 may render the target scene in a determined pose at user equipment 160. User equipment 160 shows a rendered target scene to a user, for example, through a display or a head-mounted display device.

In some embodiments, the rendering data is determined on the basis of volume density features and color features, which are associated with the target scene, of a plurality of images of the target scene in different poses. In order to understand how scene rendering model 150 generates rendering data 140, process 500 of generating rendering data by the scene rendering model will be described with reference to FIG. 5.

Assuming that there is point 502 in a three-dimensional space, the position of point 502 may be expressed as a coordinate value (x, y, z) in an XYZ coordinate system. The XYZ coordinate system may be a coordinate system with the camera as reference, or other coordinate systems converted according to internal parameters of the camera, which will not be limited in the present disclosure. Meanwhile, the camera for photographing point 502 also has a pose, including viewing angle d for observing point 502.

In scene rendering model 150, a representation of point 502 may be transformed into its volume density feature 504 and color feature 506 in a color coordinate system. Volume density feature 504 may be understood as opacity, i.e., whether light can penetrate through point 502 and a degree to which light penetrates through point 502. Since light irradiates point 502 at different angles, point 502 may have changing color feature 506, which can be represented by an RGB value. Therefore, rendering data 140 generated by scene rendering model 150 will include point cloud information reflecting an outline of the target scene and color information about a surface of the target scene.

In some embodiments, rendering the target scene using the scene rendering model includes: determining, on the basis of the pose and the rendering data, a probability that light irradiates a point in a point cloud of the target scene and penetrates through the point; and determining the point cloud and the color of the target scene in the pose on the basis of the probability.

In order to understand how scene rendering model 150 renders the target scene on the basis of rendering data 140, the process will now be described in conjunction with FIG. 6. In FIG. 6, it can be seen that rendering process 600 simulates that light irradiates the target scene from the set pose for observing the target scene. Specifically, point 602 is taken as an example. Assuming that a virtual camera is located at this pose, a differential probability that light ray 604 terminates at infinitesimal particles at point 602 is calculated. Through an integration operation, a boundary of point 602, that is, a surface of point 602 in a three-dimensional space, can be calculated. Such an operation can be performed on each point in the rendering data, so that a point cloud of the surface of the target scene in the three-dimensional space can be known. Similarly, the color of the target scene can also be obtained by this principle. A probability that the light ray does not collide with other particles in a path from the beginning of irradiation to the transmission to point 602 is integrated.

In some embodiments, the scene rendering model is trained on the basis of a plurality of images of the target scene photographed from different poses, and poses and internal parameters of a camera respectively corresponding to the plurality of images. Specifically, for generation of fine-grained rendering data, scene rendering model 150 may be trained using a loss function represented by Formula (1), as follows:

$$\mathcal{L} = \sum_{r \in \mathcal{R}} \left[ \|\hat{C}_c(r) - C(r)\|_2^2 + \|\hat{C}_f(r) - C(r)\|_2^2 \right] \quad \text{Formula (1)}$$

$$\hat{C}_c(r) = \sum_{i=1}^{N_c} \omega_i c_i, \text{ where } \omega_i = T_i(1 - \exp(-\sigma_i \delta_i))$$

$$\hat{C}_f(r) = \sum_{i=1}^{N} T_i(1 - \exp(-\sigma_i \delta_i))c_i, \text{ where } T_i = \exp\left(-\sum_{j=1}^{i-1} \sigma_j \delta_j\right)$$

where $\mathcal{L}$ represents the loss function; $\hat{C}_c(r)$ represents a coarse-grained estimated color; $C(r)$ represents a label color; $r$ represents virtual light; $\mathcal{R}$ represents a light set space; $\hat{C}_f(r)$ represents a fine-grained estimated color; $\|\ldots\|_2^2$ represents an operation for calculating an absolute value of an error; $i$ represents a step length of differentiation; $N_c$ represents the number of differentiation units from a virtual camera to a target point; $c_i$ represents a color at $i$; $\omega_i$ represents a differentiation probability at $i$; $\sigma_i$ represents a volume density at $i$; $\delta_i$ represents a distance between adjacent points in a three-dimensional space; $N$ represents the total number of points; $T_i$ represents a time function.

In some embodiments, for generation of coarse-grained rendering data, scene rendering model 150 may be trained using a loss function represented by Formula (2), as follows:

$$\mathcal{L} = \sum_{r \in \mathcal{R}} \left[ \|\hat{C}_c(r) - C(r)\|_2^2 \right] \quad \text{Formula (2)}$$

$$\hat{C}_c(r) = \sum_{i=1}^{N_c} \omega_i c_i, \text{ where } \omega_i = T_i(1 - \exp(-\sigma_i \delta_i))$$

where $\mathcal{L}$ represents the loss function; $\hat{C}_C(r)$ represents a coarse-grained estimated color; $C(r)$ represents a label color; $r$ represents virtual light; $\mathcal{R}$ represents a light set space; $\|\ldots\|_2^2$ represents an operation for calculating an absolute value of an error; $i$ represents a step length of differentiation; $N_c$ represents the number of differentiation units from a virtual camera to a target point; $c_i$ represents a color at $i$; $\omega_i$ represents a differentiation probability at $i$; a $\rho_i$ represents a volume density at $i$; $\delta_i$ represents a distance between adjacent points in the three-dimensional space; and $T_i$ represents a time function.

As an example, a ratio parameter $\alpha$ can be set to determine a ratio of a fine granularity to a coarse granularity. It can be understood that the coarse-grained rendering data is $1/\alpha$ of the fine-grained rendering data. The ratio parameter $\alpha$ may also be adjusted as needed.

Therefore, scene rendering model 150 is flexible, which can generate both fine-grained rendering data and coarse-grained rendering data. Therefore, a flexible rendering effect is achieved in conjunction with the performance of the user equipment and the server as well as user preferences.

Figure 7:
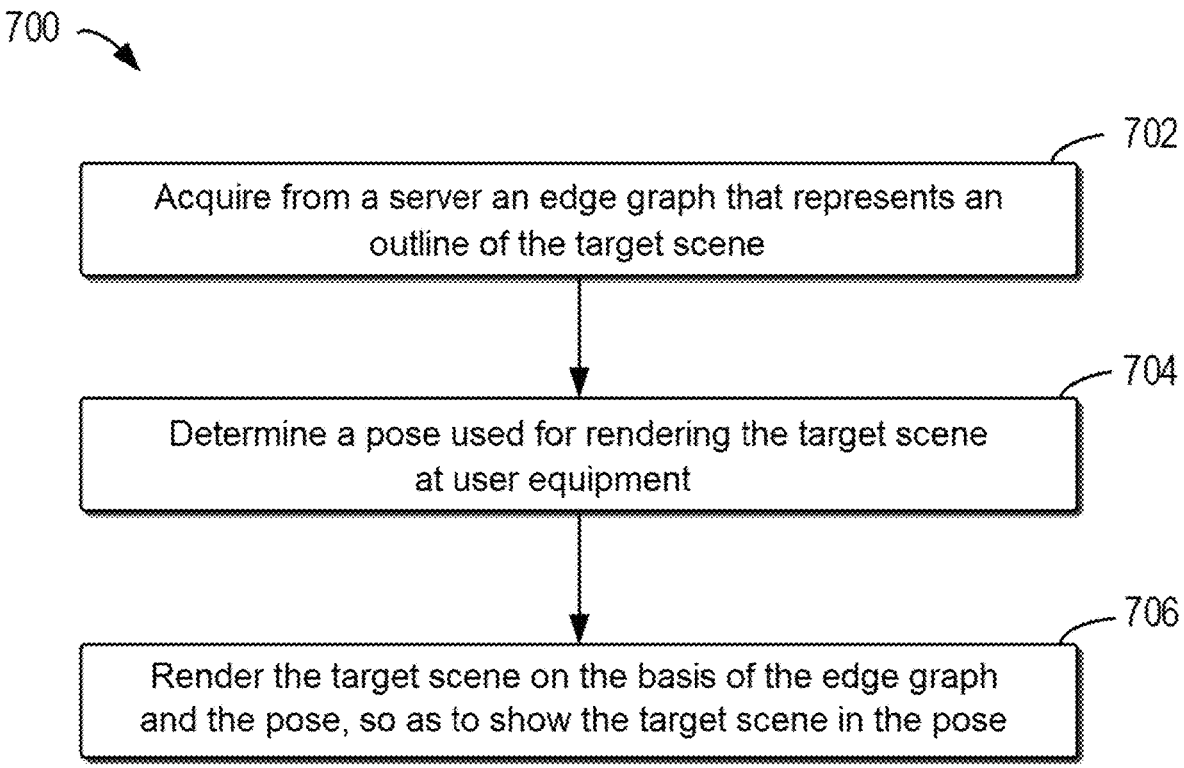
FIG. 7 is a flow chart of a method for rendering a target scene according to an example implementation of the present disclosure.
Figure 8:
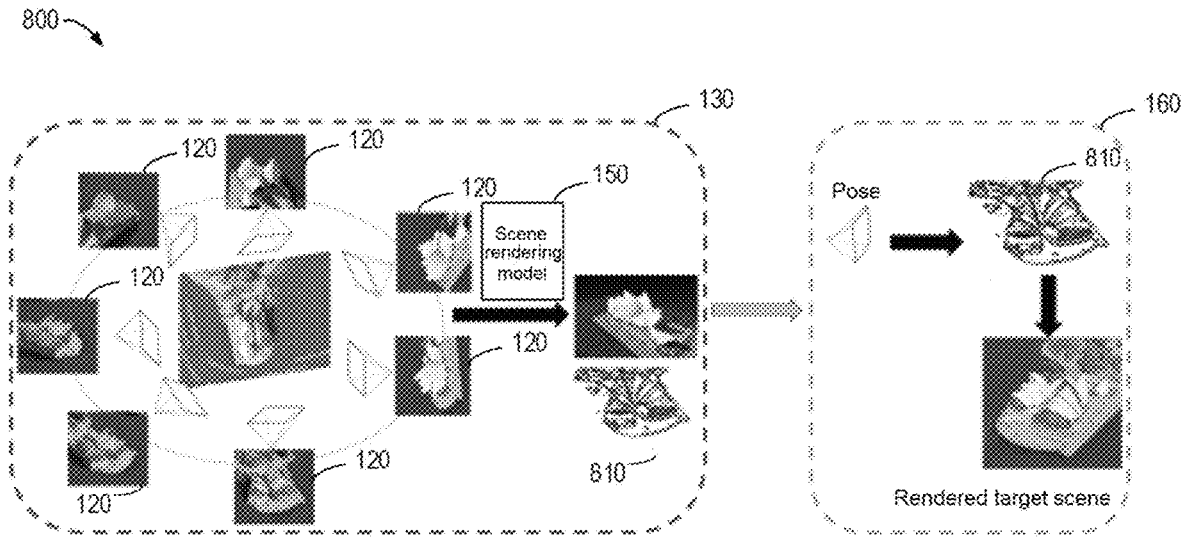
FIG. 8 is a schematic diagram of a process of rendering a target scene according to an example implementation of the present disclosure.

The present disclosure further provides a method for rendering a target scene, which will be described below in conjunction with FIG. 7 and FIG. 8. FIG. 7 illustrates a method 700 for rendering a target scene according to an example implementation of the present disclosure. FIG. 8 illustrates a process 800 for rendering a target scene according to an example implementation of the present disclosure. Method 700 may be implemented in process 800.

At block 702, an edge graph that represents an outline of the target scene is acquired from a server. For example, user equipment 160 acquires edge graph 810 from server 130. Edge graph 810 represents the outline of the target scene. Specifically, edge graph 810 may represent an outline of an entity in the target scene, such as an edge of a building, and an edge of the ocean and beach. The edge graph may be represented by a binary identifier only in a computer. For example, an edge is represented by 1. Thus, it can be known that edge graph 810 has a smaller size than rendering data 140 including the point cloud information and the color information of the target scene, so that it is quicker and more convenient to transmit the edge graph. It can be understood that an edge generally includes rich details, so that it needs to be emphatically rendered to achieve a better rendering effect. Positions that are not contained in edge graph 810 are smooth and contain fewer details, so that they possibly do not need much rendering.

At block 704, a pose used for rendering the target scene at user equipment is determined. In user equipment 160, if a user uses a computing device such as a mobile terminal, a pose for observing the target scene can be set via the user equipment. If the user wears a virtual display device such as a head-mounted display device, a pose for observing the target scene can be collected via the virtual display device. It can be understood that due to different poses for observing the target scene, rendered target scenes may have different sizes, outlines, or colors.

At block 706, the target scene is rendered on the basis of the edge graph and the pose, so as to show the target scene in the pose. For example, at user equipment 160, the target scene is rendered on the basis of edge graph 810 and the set pose for observing the target scene using scene rendering model 150, so as to show the target scene in the pose to the user.

Since the edge graph is transmitted to the user equipment by the server, the bandwidth and time required for the transmission of the data are saved. At the user equipment, since the scene rendering model is used to render the target scene on the basis of the edge graph, the computing overhead of the user equipment can be saved, and rendering at a high frame rate is achieved, thus achieving real-time rendering. Meanwhile, due to the use of the edge graph, the details at the edge graph can be emphatically rendered, which further saves computing resources.

In some embodiments, a scene rendering model is acquired from a server, and a target scene is rendered using the scene rendering model. For example, referring to FIG. 8, user equipment 160 may acquire scene rendering model 150 from server 130. Scene rendering model 150 may render the target scene in a determined pose at user equipment 160. User equipment 160 shows the rendered target scene to a user, for example, through a display or a head-mounted display device.

In some embodiments, rendering the target scene using the scene rendering model includes: determining, on the basis of the pose and the edge graph, a probability that light irradiates a point on the outline of the target scene and penetrates through the point; and determining the point cloud and the color of the target scene in the pose on the basis of the probability. The principle of rendering the target scene is the same as that shown in FIG. 6, but the rendering of the target scene based on the edge graph will be emphasized here because there are more details at edges. For example, a scene rendering model trained with a fine-grained loss function may be used to render edges, while a scene rendering model trained with a coarse-grained loss function may be used to render non-edge positions (i.e., smooth regions).

In some embodiments, the scene rendering model is trained on the basis of a plurality of images of the target scene photographed from different poses, poses and internal parameters of a camera respectively corresponding to the plurality of images, and a pre-labeled edge graph.

Specifically, edge graph 810 may be generated by scene rendering model 150. However, scene rendering model 150 is illustratively trained using a loss function represented by Formula (3) to generate edge graph 810, as follows:

$$\mathcal{L} = \sum_{r \in \mathcal{R}} \left[ \left\| \hat{C}_c(r) - C(r) \right\|_2^2 + \left\| \hat{C}_f(r) - C(r) \right\|_2^2 \right] \quad \text{Formula (3)}$$

$$\tau = \begin{cases} 1 & \text{when sigmoid}(p) > 0.5 \\ 0 & \text{when sigmoid}(p) \leq 0.5 \end{cases}$$

$$\hat{C}_c(r) = \sum_{i=1}^{N_c} \omega_i c_i, \text{ where } \omega_i = T_i(1 - \exp(-\sigma_i \delta_i))$$

$$\hat{C}_f(r) = \sum_{i=1}^{N} T_i(1 - \exp(-\sigma_i \delta_i)) c_i, \text{ where } T_i = \exp\left(-\sum_{j=1}^{i-1} \sigma_j \delta_j\right)$$

where $\mathcal{L}$ represents the loss function; $\hat{C}_c(r)$ represents a coarse-grained estimated color; $C(r)$ represents a label color; r represents virtual light; $\mathcal{R}$ represents a light set space; $\hat{C}_f(r)$ represents a fine-grained estimated color; $\| \ldots \|_2^2$ represents an operation for calculating an absolute value of an error; i represents a step length of differentiation; $N_c$ represents the number of differentiation units from a virtual camera to a target point; $c_i$ represents a color at i; $\omega_i$ represents a differentiation probability at i; $\sigma_i$ represents a volume density at i; $\delta_i$ represents a distance between adjacent points in a three-dimensional space; N represents the total number of points; $T_i$ represents a time function; sigmoid(p) represents a function for normalizing an edge score; and $\tau$ represents a control parameter.

In some embodiments, the edge graph is generated on the basis of an edge score of a point in a point cloud of the target scene. In some embodiments, the edge score is determined on the basis of a probability indicating that the point is on the outline of the target scene. In some embodiments, the point with the probability greater than a threshold probability is identified on the edge graph.

As an example, the trained scene rendering model may generate value p, and p can be understood as a feature of the probability indicating that the point is on the outline of the target scene and can be understood as an edge score. On the basis of p, control parameter $\tau$ is determined using normalization function sigmoid. When sigmoid(p) is greater than 0.5, $\tau$ may be set to be 1, meaning that this point is an outline in the edge graph. Otherwise, this point is part of a smooth region. The point that is determined to be the outline is identified on the edge graph, thus obtaining edge graph 810.

The edge graph is used in method 700, so that the data volume to be transmitted from the server to the user equipment can be further reduced. On the user equipment side, the rendering of the target scene can be emphasized on the basis of the edge graph, so that the computing overhead of the user equipment is reduced, and the rendering speed is increased.

Figure 9:
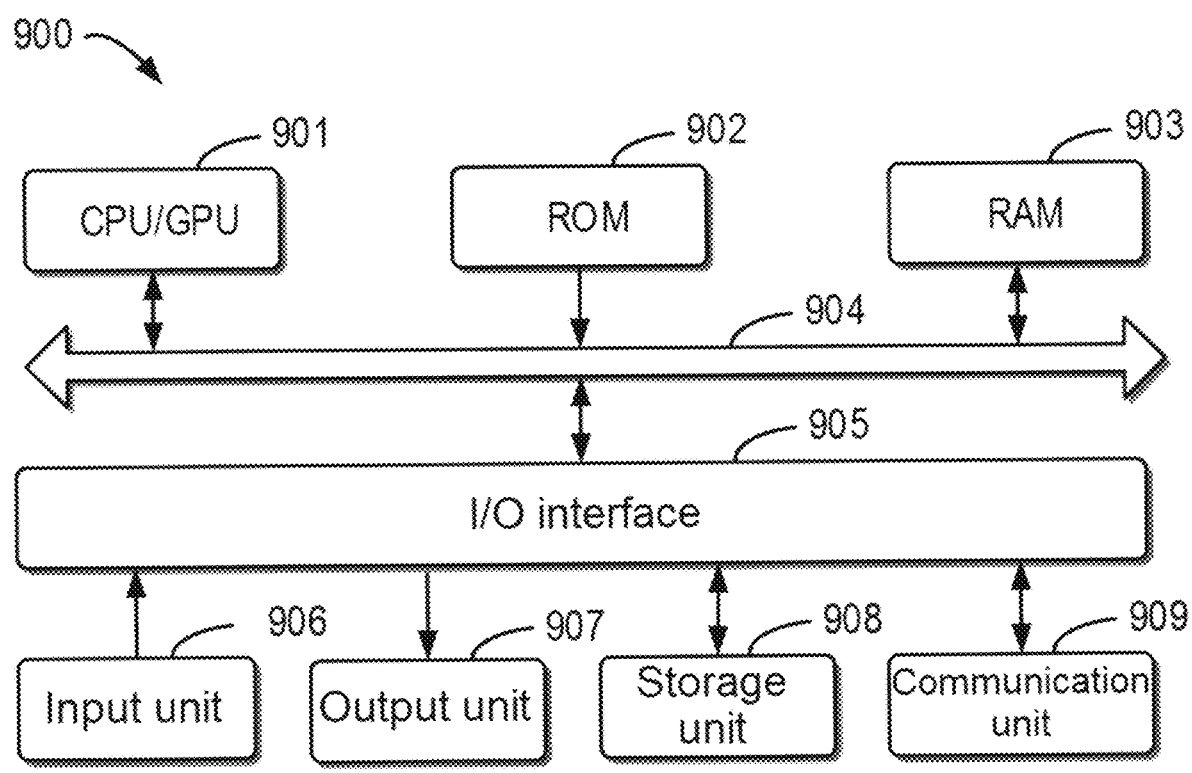
FIG. 9 is a block diagram of a device for rendering a target scene according to an example implementation of the present disclosure.

FIG. 9 illustrates a device 900 that may be configured to implement embodiments of the present disclosure. Device 900 may be a device or apparatus described in embodiments of the present disclosure. As shown in FIG. 9, device 900 includes central processing unit (CPU) and/or graphic processing unit (GPU) 901 that may perform various appropriate actions and processing according to computer program instructions stored in read-only memory (ROM) 902 or computer program instructions loaded from storage unit 908 to random access memory (RAM) 903. Various programs and data required for the operation of device 900 may also be stored in RAM 903. CPU/GPU 901, ROM 902, and RAM 903 are connected to each other through bus 904. Input/output (I/O) interface 905 is also connected to bus 904. Although not shown in FIG. 9, device 900 may also include a co-processor.

A plurality of components in device 900 are connected to I/O interface 905, including: input unit 906, such as a keyboard and a mouse; output unit 907, such as various types of displays and speakers; storage unit 908, such as a magnetic disk and an optical disc; and communication unit 909, such as a network card, a modem, and a wireless communication transceiver. Communication unit 909 allows device 900 to exchange information/data with other devices via a computer network, such as the Internet, and/or various telecommunication networks.

The various methods or processes described above may be performed by CPU/GPU 901. For example, in some embodiments, the method may be embodied as a computer software program that is tangibly included in a machine-readable medium, such as storage unit 908. In some embodiments, part or all of the computer program may be loaded and/or installed onto device 900 via ROM 902 and/or communication unit 909. When the computer program is loaded into RAM 903 and executed by CPU/GPU 901, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or the technical improvements to technologies on the market, so as to enable persons of ordinary skill in the art to understand the embodiments disclosed herein.

What is claimed is:

1. A method for rendering a target scene, comprising:
    acquiring from a server rendering data comprising a point cloud and color information of the target scene;
    determining a pose used for rendering the target scene at user equipment; and
    rendering the target scene on the basis of the rendering data and the pose, so as to show the target scene in the pose;

wherein rendering the target scene comprises:
determining, on the basis of the rendering data and the pose, a probability that light irradiates a point in the point cloud of the target scene and penetrates through the point; and
rendering the target scene in the pose on the basis of the probability.

2. The method according to claim 1, wherein the rendering data is first rendering data, and the first rendering data is determined by performing downsampling on second rendering data, a resolution of the second rendering data being higher than that of the first rendering data.

3. The method according to claim 2, wherein rendering the target scene on the basis of the rendering data and the pose comprises:
performing upsampling on the first rendering data on the basis of the pose to determine the first rendering data after upsampling; and
determining the point cloud and the color information of the target scene in the pose using the first rendering data after upsampling.

4. The method according to claim 1, wherein the rendering data is determined on the basis of volume density features and color features, which are associated with the target scene, of a plurality of images of the target scene in different poses.

5. The method according to claim 4, further comprising:
acquiring a scene rendering model from the server; and
rendering the target scene using the scene rendering model.

6. The method according to claim 5, wherein the scene rendering model is trained on the basis of a plurality of images of the target scene photographed from different poses, as well as poses and internal parameters of a camera respectively corresponding to the plurality of images.

7. A method for rendering a target scene, comprising:
acquiring from a server an edge graph that represents an outline of the target scene;
determining a pose used for rendering the target scene at user equipment; and
rendering the target scene on the basis of the edge graph and the pose, so as to show the target scene in the pose;
wherein rendering the target scene comprises:
determining, on the basis of the edge graph and the pose, a probability that light irradiates a point on the outline of the target scene and penetrates through the point; and
determining a point cloud and color information of the target scene in the pose on the basis of the probability.

8. The method according to claim 7, further comprising:
acquiring a scene rendering model from the server; and
rendering the target scene using the scene rendering model.

9. The method according to claim 7, wherein the edge graph is generated on the basis of an edge score of a point in the point cloud of the target scene.

10. The method according to claim 9, wherein the edge score is determined on the basis of a probability indicating that the point is on the outline of the target scene.

11. The method according to claim 10, wherein the point with the probability greater than a threshold probability is identified on the edge graph.

12. A method for rendering a target scene, comprising:
acquiring from a server an edge graph that represents an outline of the target scene;
determining a pose used for rendering the target scene at user equipment; and
rendering the target scene on the basis of the edge graph and the pose, so as to show the target scene in the pose;
wherein the method further comprises:
acquiring a scene rendering model from the server; and
rendering the target scene using the scene rendering model; and
wherein the scene rendering model is trained on the basis of a plurality of images of the target scene photographed from different poses, poses and internal parameters of a camera respectively corresponding to the plurality of images, and a pre-labeled edge graph.

13. An electronic device, comprising:
a processor; and
a memory coupled to the processor, wherein the memory has instructions stored therein which, when executed by the processor, cause the device to execute actions comprising:
acquiring from a server rendering data comprising a point cloud and color information of a target scene;
determining a pose used for rendering the target scene at user equipment; and
rendering the target scene on the basis of the rendering data and the pose, so as to show the target scene in the pose;
wherein rendering the target scene comprises:
determining, on the basis of the rendering data and the pose, a probability that light irradiates a point in the point cloud of the target scene and penetrates through the point; and
rendering the target scene in the pose on the basis of the probability.

14. The electronic device according to claim 13, wherein the rendering data is first rendering data, and the first rendering data is determined by performing downsampling on second rendering data, a resolution of the second rendering data being higher than that of the first rendering data.

15. The electronic device according to claim 14, wherein rendering the target scene on the basis of the rendering data and the pose comprises:
performing upsampling on the first rendering data on the basis of the pose to determine the first rendering data after upsampling; and
determining the point cloud and the color information of the target scene in the pose using the first rendering data after upsampling.

16. The electronic device according to claim 13, wherein the rendering data is determined on the basis of volume density features and color features, which are associated with the target scene, of a plurality of images of the target scene in different poses.

17. A computer program product tangibly stored on a non-transitory computer-readable medium and comprising computer-executable instructions, wherein the computer-executable instructions, when executed by a device, cause the device to perform the method according to claim 1.

18. A computer program product tangibly stored on a non-transitory computer-readable medium and comprising computer-executable instructions, wherein the computer-executable instructions, when executed by a device, cause the device to perform the method according to claim 7.

* * * * *